Patented Jan. 15, 1935

1,987,614

UNITED STATES PATENT OFFICE 1,987,614

THIAZOLE AND PROCESS OF PRODUCTION

Arthur L. Fox, Wilmington, Del., assignor to E. I. du Pont de Nemours & Company, Wilmington, Del., a corporation of Delaware No Drawing. Application May 27, 1930, Serial No. 456,289

24 Claims. (Cl. 260—44)

This invention relates to the preparation of aryl-amino-thiazoles and more particularly to their preparation from aryl-thioureas.

Dyson, Hunter and Morris (Chemical Society Journal Transactions—1927—pages 1186–92) have shown that amino-benzo-thiazoles may be prepared by the action of bromine on phenyl-thioureas suspended or dissolved in chloroform.

A somewhat similar ring closure results by treatment with chlorine instead of bromine. Other solvents for example chloro-benzene, ortho-di-chloro-benzene and ethylene di-chloride may be used. A ring closure also results from using sulfuryl chloride instead of either bromine or chlorine.

This invention has for an object the preparation of new chemical compounds. Other objects are to devise new processes for the formation of thiazole rings in organic compounds, to decrease or prevent nuclear substitution in the formation of thiazole compounds from aryl-thioureas, to devise new processes for the preparation of aryl-amino-thiazoles which will allow smoother operation of the reaction, to devise processes which will give improved products, and to devise processes for the preparation of such compounds which will give higher yields. Other objects will appear hereinafter.

These objects are accomplished by the present invention whereby a mixture of sulfuryl chloride and a halogen is treated or reacted with compounds of the type

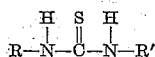

to produce products of the type

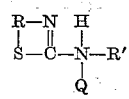

in which R is an aryl radical which may contain substituents for example, halogen, alkyl, alkoxy, or aryl, but which has one position, ortho to the —NH group free; in which R' is either hydrogen, aryl or an alkyl group and Q stands for hydro-halide, that is hydro-chloride or the like. Throughout the specifications and claims the word "aryl" is used to denote an unsubstituted or substituted nucleus. Where a nucleus of either of these types is mentioned to the exclusion of the other, its full name is employed. The term "aryl" is used synonymously with aromatic and covers only carbocyclic compounds.

The invention will be further understood from a consideration of the following examples. The parts are given by weight.

Example I

One hundred and fifty (150) parts of para-ethoxy-phenyl-thiourea

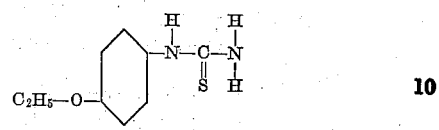

and 500 parts of chloro-benzene were mixed in a stone lined tub fitted with an agitator and a good vent. To this well stirred slurry was added a mixture of 95 parts of sulfuryl chloride, 25 parts of bromine and 250 parts of chloro-benzene. During the addition there was a rapid evolution of gas. The resultant mixture was then stirred two hours and filtered. A yield of 160 parts of para-ethoxy-amino-benzo-thiazole

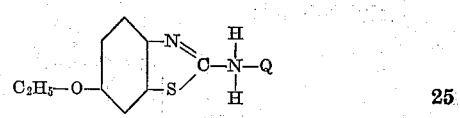

(Q being hydro-halide) in the form of a mixture of the hydrochloride and hydrobromide in undetermined proportions was obtained. For convenience sake this mixture is referred to as a hydro-halide.

Example II

Ninety-eight (98) parts of para-ethoxy-phenyl-thiourea and about 300 parts of chloro-benzene were mixed and to the mixture was added a mixture of 125 parts of chloro-benzene, 5.6 parts of chlorine and 60 parts of sulfuryl chloride. There was considerable evolution of gas on mixing these components. After stirring for two hours the mixture was filtered and a yield of 92 parts of the hydro-chloride of para-ethoxy-amino-benzo-thiazole obtained.

Example III

Eighty-three (83) parts of ortho-tolyl-thiourea

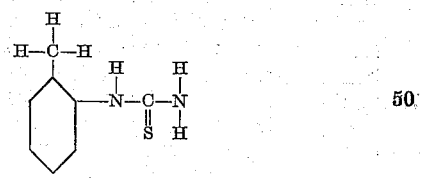

and 300 parts chloro-benzene were mixed and to the mixture was added 150 parts chloro-benzene, containing 36 parts sulfuryl chloride and 6.7 parts bromine. There was an immediate reaction and the solid went into solution but very quickly a new solid came out of solution. It was stirred two hours and then filtered. Yield 87 parts of ortho-tolyl-amino-thiazole-hydro-halide,

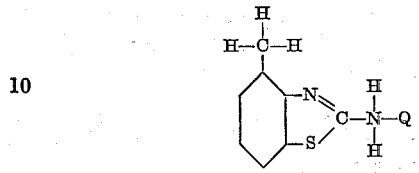

(Q being hydro-halide).

The process can be applied successfully to other thioureas of a similar nature. The following give excellent results. 4-chloro-2-methyl-phenyl-thioureas,

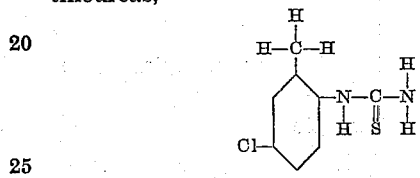

di-ortho-tolyl-thiourea,

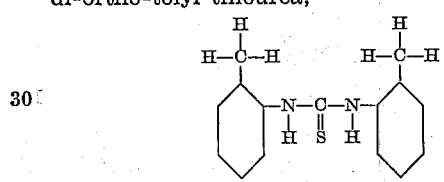

α-naphthyl-thiourea, (Bz-5,6-(1′,4′-buta-dienylene)-phenyl-thiourea)

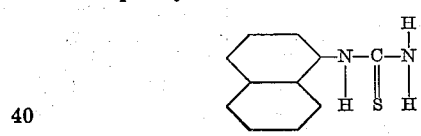

p-tolyl-thiourea,

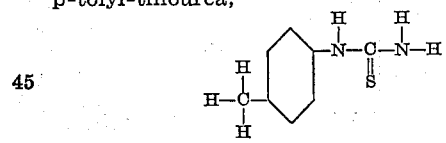

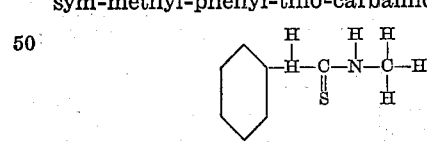

and di-methyl-phenyl-thio-carbamide.

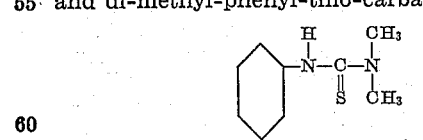

Other solvents than those mentioned, supra for example benzene, carbon-tetra-chloride and nitro-benzene may be used successfully.

The halogen may be mixed with sulfuryl chloride directly but for convenience of operation it is preferably added to a mixture of sulfuryl chloride and a part of the solvent employed. Chlorobenzene or ortho-di-chloro-benzene are the solvents ordinarily used, but this is largely because of the price. Ethylene-di-chloride can be used equally well. In general other solvents that do not react readily with the reagents utilized may be employed.

Preferably the initial temperatures of the components of the mixture are from 15°–30° C. But the operation may be carried out successfully (although not as efficiently) at higher or lower temperatures.

The amount of solvent may be widely varied. A deficiency of halogen results in a less efficient process, so in general it is preferable to use a molecular or excess proportion of halogen.

The particular amounts of the re-agents set out above give excellent results.

The ratio of sulfuryl chloride to halogen may vary. Ordinarily about 20% of the sulfuryl chloride can be replaced by an equivalent molecular proportion of the halogen. This new process has an advantage of greatly reducing or preventing halogen ring substitution in certain cases. In addition the reaction takes place much more smoothly and gives greater yields of the product. The product in turn has greatly superior physical properties.

As many apparently widely different embodiments of this invention may be made without departing from the spirit and scope thereof, it is to be understood that I do not limit myself to the specific embodiments thereof except as defined in the appended claims.

I claim:

1. The process comprising treating substances of the class

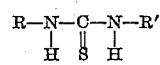

wherein R is a benzene nucleus having one position ortho to the —NH group free and which may have substituents from the group consisting of alkyl, alkoxy, halogen and 1:4-buta-dienylene and R′ is a member of the group consisting of hydrogen, alkyl and phenyl nuclei which may have substituents from the group consisting of alkyl, alkoxy, halogen and 1:4-buta-dienylene, with sulfuryl-chloride and a halogen.

2. The process of preparing amino-aryl-thiazoles comprising treating a substance of the class

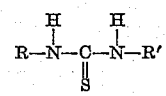

wherein R is a benzene nucleus having one position ortho to the —NH group free and R′ is a member of the group consisting of hydrogen, alkyl and phenyl radicals with a mixture of bromine and sulfuryl-chloride.

3. The process of preparing amino-aryl-thiazoles comprising treating a substance of the class

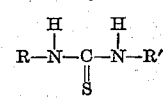

wherein R is a benzene nucleus having one position ortho to the —NH group free and R′ is a member of the group consisting of hydrogen, alkyl and phenyl radicals with a mixture of bromine and sulfuryl-chloride, in the presence of a solvent which does not readily react with the other ingredients.

4. In the process of producing alkoxy-amino-benzo-thiazoles the step of reacting alkoxy-phenyl-thioureas with a mixture of bromine and sulfuryl-chloride.

5. The process of producing alkoxy-amino-benzo-thiazoles comprising treating alkoxy-phenyl-thioureas with a mixture of bromine and sulfuryl-chloride in the presence of an inert solvent.

6. The process comprising reacting a para-ethoxy-phenyl-thiourea with a halogen and sulfuryl-chloride.

7. The process comprising treating a para-ethoxy-phenyl-thiourea with a bromine and sulfuryl-chloride.

8. The process comprising treating a para-ethoxy-phenyl-thiourea with a halogen and sulfuryl-chloride in the presence of an inert solvent.

9. The process comprising treating a para-ethoxy-phenyl-thiourea with bromine and sulfuryl-chloride in the presence of an inert solvent.

10. The process of restraining the nuclear halogen substitution during the formation of alkoxy-amino-benzo-thiazoles from alkoxy-phenyl-thioureas by treatment with sulfuryl-chloride which comprises replacing a portion of the sulfuryl-chloride necessary to complete the reaction when used alone, with a halogen.

11. The process comprising adding about 150 parts of para-ethoxy-phenyl-thiourea to about 500 parts of chloro-benzene and to the resultant slurry adding about 95 parts of sulfuryl-chloride and about 25 parts of bromine in about 250 parts of chloro-benzene, and finally separating the para-ethoxy-amino-benzo-thiazole compound formed.

12. The process of restraining the nuclear halogen substitution during the formation of amino-benzo-thiazoles from para-ethoxy-phenyl-thiourears by treatment with sulfuryl-chloride which comprises replacing a portion of the sulfuryl-chloride necessary to complete the reaction, when used alone, with a halogen, the said sulfuryl-chloride and halogen being added to the material treated simultaneously.

13. The process of restraining the nuclear halogen substitution during the formation of amino-benzo-thiazoles comprising treating para-ethoxy-phenyl-thiourea with a mixture of sulfuryl chloride and bromine.

14. The process comprising treating substances of the class

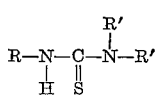

wherein R is a benzene nucleus having one position ortho to the —NH group free and R' is a member of the group consisting of hydrogen, alkyl and phenyl radicals, with sulfuryl-chloride and a halogen.

15. The process comprising treating substances of the class

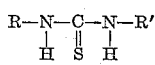

wherein R is a benzene or naphthalene nucleus having one position ortho to the —NH group free and R' is a member of the group consisting of hydrogen, alkyl and a benzene or naphthalene radical, with sulfuryl-chloride and a halogen.

16. The process of preparing amino-aryl-thiazoles comprising treating a substance of the class

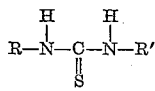

wherein R is a benzene or naphthalene nucleus having one position ortho to the —NH group free and R' is a member of the group consisting of hydrogen, alkyl and a benzene or naphthalene radical with a mixture of bromine and sulfuryl-chloride.

17. The process of preparing amino-aryl-thiazoles comprising treating a substance of the class

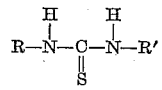

wherein R is a benzene or naphthalene nucleus having one position ortho to the —NH group free and R' is a member of the group consisting of hydrogen, alkyl and a benzene or naphthalene radical with a mixture of bromine and sulfuryl-chloride, in the presence of a solvent which does not readily react with the other ingredients.

18. In the process of producing amino-aryl-thiazoles of the benzene or naphthalene series the step of reacting aryl thioureas of the benzene or naphthalene series with a mixture of bromine and sulfuryl-chloride.

19. The process of producing amino-aryl-thiazoles of the benzene or naphthalene series comprising treating aryl thioureas of the benzene or naphthalene series with a mixture of bromine and sulfuryl-chloride in the presence of an inert solvent.

20. The process of restraining the nuclear halogen substitution during the formation of amino-aryl-thiazoles of the benzene or naphthalene series from aryl thioureas of the benzene or naphthalene series by treatment with sulfuryl-chloride which comprises replacing a position of the sulfuryl-chloride necessary to complete the reaction when used alone, with a halogen.

21. The process comprising treating substances of the class

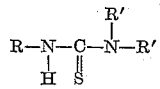

wherein R is a benzene or naphthalene nucleus having one position ortho to the —NH group free and R' is a member of the group consisting of hydrogen, alkyl and benzene or naphthalene radicals, with sulfuryl-chloride and a halogen.

22. The process of preparing benzo-thiazoles comprising adding an alkyl-phenyl thiourea to chloro-benzene and to the resultant adding sulfuryl chloride and bromine in chloro-benzene and finally separating the benzothiazole compound formed.

23. The process of preparing benzo-thiazoles comprising adding an alkoxy-phenyl thiourea to chloro-benzene and to the resultant adding sulfuryl chloride and bromine in chloro-benzene and finally separating the benzothiazole compound formed.

24. The process of preparing thiazoles comprising adding a Bz-(1',4'-buta-dienylene)-phenyl thiourea to chloro-benzene and to the resultant adding sulfuryl chloride and bromine in chloro-benzene and finally separating the thiazole compound formed.

ARTHUR L. FOX.